United States Patent [19]

Hansen

[11] 4,222,113
[45] Sep. 9, 1980

[54] TRANSMIT-RECEIVE SWITCHING UNIT

[75] Inventor: Henning M. Hansen, Nordborg, Denmark

[73] Assignee: Danfoss A/S, Nordborg, Denmark

[21] Appl. No.: 966,889

[22] Filed: Dec. 6, 1978

[30] Foreign Application Priority Data

Dec. 14, 1977 [DE] Fed. Rep. of Germany ....... 2755619

[51] Int. Cl.² ............................ G01S 9/66; H04B 1/44
[52] U.S. Cl. ........................................ 367/87; 307/99; 367/903; 455/81
[58] Field of Search ............... 325/21, 22, 23; 307/98, 307/99, 100, 130; 333/13; 340/3 A; 181/139; 343/5 SW; 367/87, 903

[56] References Cited

U.S. PATENT DOCUMENTS

| | | | |
|---|---|---|---|
| 3,227,954 | 1/1966 | Fichter, Jr. | 325/22 |
| 4,158,781 | 6/1979 | Skinner et al. | 307/99 |

*Primary Examiner*—Richard A. Farley
*Attorney, Agent, or Firm*—Wayne B. Easton

[57] ABSTRACT

The invention relates to a transmit/receive switching unit for use between a transmit/receive converter and the transmission line of a transmit/receive device having a voltage source. The unit has transmitting and receiving channels with the receiving channel having a signal amplifier. An energy storage element such as a capacitor stores a part of the transmission energy on a continuing basis for operating the signal amplifier in the receiving channel. This scheme saves having to provide a separate line from a voltage source to the amplifier.

5 Claims, 4 Drawing Figures

TRANSMIT-RECEIVE SWITCHING UNIT

The invention relates to a transmit-receive switching unit between a transmit-receive converter and a transmission line leading to a transmit-receive device with a voltage source, comprising a transmission channel through which a transmission signal is passed from the transmission line to the transmit-receive converter, and a receiving channel having a receiving signal amplifier through which a receiving signal is passed from the transmit-receive converter to the transmission line.

Known transmitter-receivers with a transmit-receive switching unit of this kind comprises a transmit-receive converter which is electroacoustic, particularly piezoelectric. For the purpose of telemetering on the echo ranging principle or to measure other physical parameters, an electric transmission signal is converted into sound waves which are to be transmitted. Similarly, sound waves reflected from the measured object or transmitted from some other transmitter-receiver are converted by it upon receipt into an electric receiving signal. The transmission and receiving signals are transmitted by the transmit-receive switching unit either by way of the transmission channel or by way of the receiving channel, depending on the amplitude of the signals. The transmit-receive converter and the transmit-receive switching unit can, depending on the length of the transmission line, be located at a large distance from a central transmit-receive device in which the transmission signals are produced and the receiving signals evaluated. An amplifier in the receiving channel of the transmit-receive switching unit amplifies the generally weak receiving signal to such an extent that the power of reception at the input of the transmit-receive device after transmission of the receiving signal by way of the transmission line is still sufficiently high to enable the receiving signal to be evaluated in the transmit-receive device. For the current supply of the receiving signal amplifier, an additional current supply line is laid from the voltage source of the transmit-receive device to the receiving signal amplifier in the transmit-receive switching unit. In additional to the transmission line which already has two cores, one has the additional cable expense produced by this current supply line.

The invention is based on the object of providing a transmit-receive switching unit of the classifying kind which calls for a lower expense with regard to the current supply for the receiving signal amplifier.

According to the invention, this problem is solved in that an energy storer for storing part of the transmission energy of the transmission signal is connected to the transmission channel of the transmit-receive switching unit and the transmit-receive amplifier is fed from this energy storer.

In this construction of the transmit-receive switching unit, an additional current supply line for the receiving signal amplifier is dispensed with. Similarly, a separate current supply source for the receiving signal amplifier is not required at the location of the transmit-receive converter and the transmit-receive switching unit. Since the transmission and receiving signals normally alternate, the portion of the transmission energy tapped from the powerful transmission signal and stored in the energy storer is adequate to amplify a receiving signal to such an extent that the receiving power at the input of the transmit-receive device is sufficient for evaluation.

In a particularly simple embodiment, the energy storer can comprise a condenser which is charged by the transmission signal.

Next, the energy storer may comprise a rectifier in series with the condenser. In this way the condenser can also be charged by transmission signals which alternate in their direction. In addition, the rectifier prevents discharging of the condenser after the transmission signal disappears.

Preferably, provision is made for a transformer stepping up the transmission signal to be provided on the input side of the transmission channel and the energy storer is connected to the side of the transformer facing the transmit-receive device. The transformer on the one hand raises the voltage amplitude of the transmission signal that is fed to the transmit-receive converter by way of the transmission channel, whereby at least partially to compensate damping brought about by the transmission line. On the other hand, it ensures that only part of the energy of the transmission signal is fed to the energy storer. The transformer also permits adaptation of the resistance of the transmit-receive converter and the transmit-receive switching unit to the wave resistance of the transmission line. During reception, the transformer steps the voltage of the receiving signal down but without markedly reducing the reception energy fed to the transmission line. On the other hand, this stepping down ensures that the energy storer is not charged again by the receiving signal.

If the energy storer comprises a charging resistor, one ensures during transmission that only a defined proportion of the transmission energy is fed to the energy storer, even in the case of an elevated input resistance of the transformer.

Preferably, the transformer is an auto-transformer. This has very low inherent losses and, in comparison with a normal transformer, can be made with less material because the secondary voltage winding already forms part of the primary voltage winding.

The invention and its developments will now be described in more detail with reference to a preferred example shown in the drawing, wherein.

Figure 1:
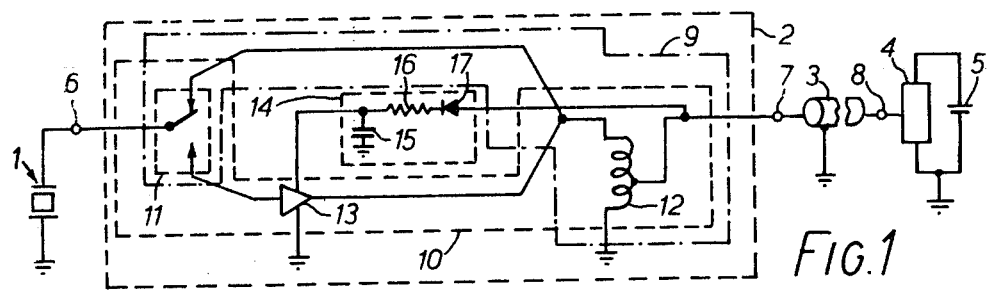
FIG. 1 is a diagrammatic representation of a transmitter-receiver with a transmit-receive switching unit according to the invention.

The transmitter-receiver of FIG. 1 is an electroacoustic measuring device for the measurement of distances or other physical parameters according to the echo ranging principle. For this purpose it comprises a piezoelectric transmit-receive converter 1 which converts the electric signals into sound waves, preferably ultrasonic waves, and vice versa, a transmit-receive switching unit 2, a coaxial transmission line 3, a transmit-receive device 4 in which the transmission signals are produced and the receiving signals are evaluated, and a voltage source 5 at the location of the transmit-receive device 4. The transmit-receive switching unit 2 is connected on the one hand by way of a connection 6 to the transmit-receive converter 1 and on the other hand by way of a connection 7 to the transmission line 3 of which the other end is connected to the transmit-receive device 4 by way of a connection 8.

The transmit-receive switching unit 2 consists of a transmission channel 9 and a receiving channel 10, which intersect at the ends.

Common to both of these there is an electronic switch-over device 11 which, for the purpose of clarity, is illustrated with a switch-over contact, and an auto-transformer 12. The switch-over device 11 is disposed on the output side of the transmission channel 9 or the input side of the receiving channel 10 and the auto-transformer 12 is disposed on the input side of the transmission channel 9 or the output side of the receiving channel 10. The receiving channel 10 contains an amplifier 13 to amplify the weak preceding signals to such an extent that, depending on the length of the transmission line 3, they can still be utilised in the transmit-receive device 4. The current supply for the amplifier 13 is from an energy storer 14 connected to the input side of the transmission channel 9. The energy storer 14 contains a condenser 15, and ohmic charging resistor 16 and a rectifier 17 in the form of a diode, all in series.

With high signals fed to the transmit-receive switching unit 2, i.e. in the case of transmission signals, the switch-over device 11 assumes the illustrated condition in which it connects the transmission channel 9 to the transmit-receive converter 1 and cuts out the receiving channel 10. On the other hand, if the transmit-receive switching unit 2 is fed with low signals, i.e. receiving signals, the switch-over device 11 assumes the other condition in which it connects the transmit-receive converter 1 to the receiving channel 10 and cuts out the transmission channel.

During transmission, an electric signal sent out by the transmit-receive device 4 is therefore fed by way of the line 3, the transformer 12 which steps up the voltage amplitude of the transmission signal, the adjoining portion of the transmission channel 9 and the switch-over device 11 which assumes the illustrated condition to the transmit-receive converter 1 which converts the transmission signal into a sound wave and sends the latter out. Simultaneously, the condenser 15 is charged by way of the rectifier 17 and the charging resistor 16 by part of the transmission signal. The auto-transformer 12 and the charging resistor 16 ensure that not all of the transmission energy flows into the energy storer 14 but a nevertheless adequately high voltage is available to switch the switch-over device 11 and send out the sound waves. The charging resistor 16 also prevents overloading of the condenser 15.

During reception, i.e. when the transmit-receive converter 1 receives sound waves, the switch-over device 11 is switched over so that the receiving signal is fed from the transmit-receive converter 1 by way of the switch-over contact of the switch-over device 11, the amplifier 13 which is now fed by the condenser 15, the transformer 12 and the transmission line 3 to the transmit-receive device 4 for the purpose of evaluation. The received sound waves may be the echo of a transmitted sound wave or sound waves sent out by some other electro-acoustic transmitter-receiver alternately with the illustrated transmitter-receiver. The output voltage of the amplifier 13 is stepped down by the auto-transformer 12 but the current is stepped up, thereby ensuring that the rectifier 17 is blocked during reception but sufficient receiving power is nevertheless available at the input 8 of the transmit-receive device 4.

The transformer 12 also permits the resistance of the transmit-receive converter and the transmit-receive switching unit to be adapted to the wave resistance of the transmission line 3. In all cases it is more advantageous if the transformer 12 is adjustable.

Figure 2:
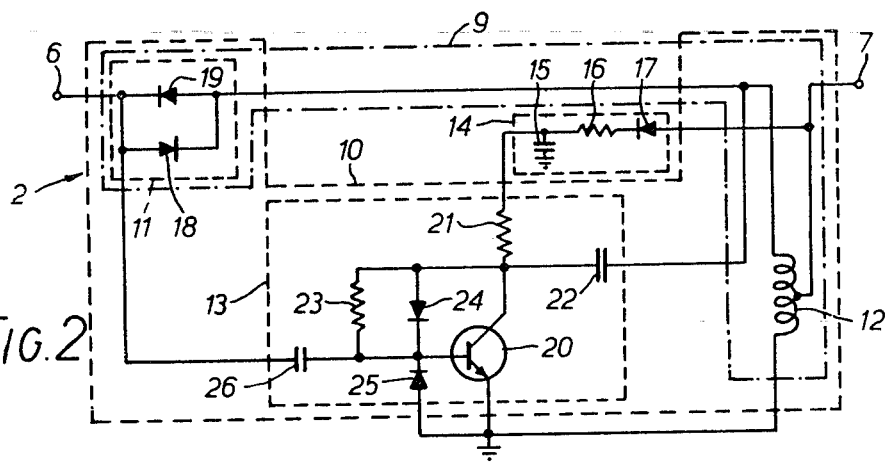
FIG. 2 is a more detailed circuit diagram of the transmit-receive switching unit of FIG. 1.

FIG. 2 illustrates the construction of the transmit-receive switching unit 2 in more detail. The switch-over device 11 contains two anti-parallel-connected diodes 18 and 19 which are connected on the one hand to the connection 6 and on the other hand to the unearthed end of the auto-transformer 12. The amplifier 13 contains an NPN transistor 20 of which the emitter is earthed and the collector connected by way of an ohmic operating resistor 21 to the output of the energy storer 14 between the condenser 15 and charging resistor 16. An output condenser 22 leads from the collector of the transistor 20 to the unearthed end of the auto-transformer 12. Between the collector and the base of the transistor 20 there are an ohmic resistor 23 and a diode 24 connected in parallel, the anode of this diode 24 being connected to the collector. A further diode 25 is disposed between the base and emitter of the transistor 20, its cathode being connected to the base. Finally, the base is connected to the connection 6 by way of an input condenser 26.

Figure 3:
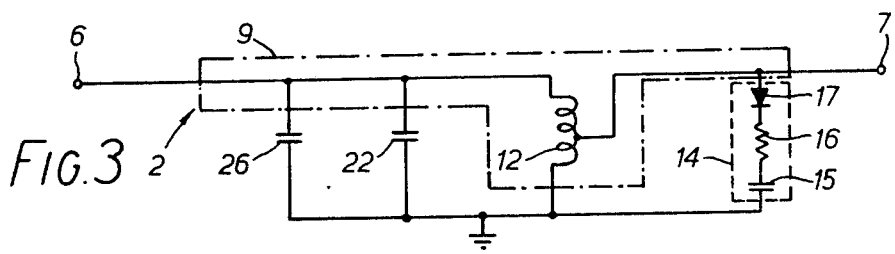
FIG. 3 is an equivalent circuit of the transmit-receive switching unit during transmission.

When the transmit-receive device 4 feeds such a high transmission signal to the connection 7 that the saturation voltage of the diodes 18, 19 and 24 is exceeded, these diodes to all intents and purposes represent a short circuit so that the transistor 20 is conductive and at the same time protected from excess voltages. One therefore obtains the equivalent circuit shown in FIG. 3. It will be evident that the transmission signal is fed partly to the energy storer 14 and partly by way of the auto-transformer 12 direct to the connection 6.

Figure 4:
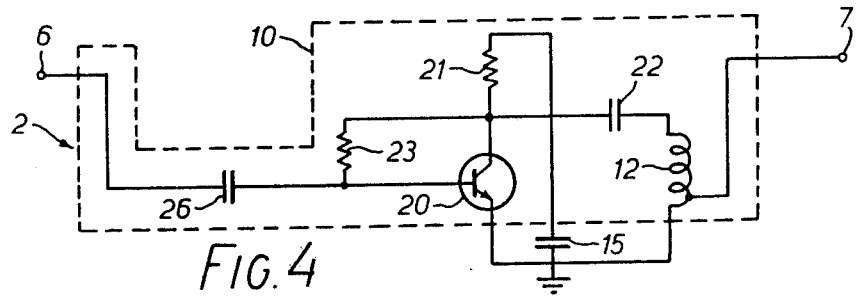
FIG. 4 is an equivalent circuit of the transmit-receive switching unit during reception.

In contrast, if the transmit-receive converter 1 feeds a receiving signal to the connection 6, this signal is so weak that the saturation voltage of the diodes 18, 19, 24 and 25 is not exceeded. These diodes are therefore practically blocked. Further, the diode 17 is blocked, thereby resulting in the equivalent circuit shown in FIG. 4. It will be evident that the receiving signal from the connection 6 is fed by way of the condenser 26, the base of the transistor 20 fed by the condenser 15, and the collector of the transistor in amplified form by way of the condenser 22 and the transformer 12 to the connection 7.

The advantage of this construction of the transmit-receive switching unit 2 resides in the fact that one can make do without an additional current supply line between the amplifier 13 and the voltage source 5 or without a separate voltage source for the amplifier 13 and nevertheless arrange the converter 1 together with the transmit-receive switching unit 2 at a large distance from the central transmit-receive switching unit 4 corresponding to the length of the transmission line 3.

In a particular embodiment, the resistors and condensers had the following values:
Resistor 16=47 ohm
Resistor 21=22 kiloohm
Resistor 23=180 kiloohm
Condenser 15=10 microfarad, 35 volt
Condenser 22=1 nanofarad, 400 volt
Condenser 26=1 nanofarad, 400 volt

What is claimed:

1. A transmit/receive switching unit for installation between a transmit/receive converter and a transmission line of a transmit/receive device with a voltage source, comprising, transmitting and receiving terminals, transmission and receiving channels between said terminals, said receiving channel having signal amplifier means, and energy storage means for storing a part of the transmission energy of transmitting signals for operating said amplifier means.

2. A transmit/receive unit according to claim 1 wherein said energy storage means includes a capacitor.

3. A transmit/receive unit according to claim 2 wherein said energy storage means includes a rectifier in series with said capacitor.

4. A transmit/receive unit according to claim 1 including transformer means common to said transmitting and receiving channels and being connected to said transmitting terminal for stepping up the trasmitting signal, said energy storage means also being connected to said transmitting terminal in branching relationship to said transformer.

5. A transmit/receive unit according to claim 4 wherein said transformer means is an autotransformer.

* * * * *